United States Patent
Huang et al.

(10) Patent No.: US 10,012,122 B2
(45) Date of Patent: *Jul. 3, 2018

(54) SYSTEM AND METHOD FOR REGULATING EXHAUST EMISSIONS

(71) Applicant: Deere & Company, Moline, IL (US)

(72) Inventors: Shyan-Cherng Huang, Cedar Falls, IA (US); Taner Tuken, Cedar Falls, IA (US); Thomas M. Harris, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/472,762

(22) Filed: Mar. 29, 2017

(65) Prior Publication Data

US 2017/0198619 A1    Jul. 13, 2017

Related U.S. Application Data

(63) Continuation of application No. 14/870,039, filed on Sep. 30, 2015, now Pat. No. 9,616,385.

(51) Int. Cl.
*B01D 53/94* (2006.01)
*F01N 3/035* (2006.01)
(Continued)

(52) U.S. Cl.
CPC .......... *F01N 3/208* (2013.01); *B01D 53/9409* (2013.01); *B01D 53/9477* (2013.01);
(Continued)

(58) Field of Classification Search
CPC .......... B01D 53/9418; B01D 2258/012; B01D 53/9495; F01N 3/021; F01N 3/035; F01N 3/2066; F01N 3/208
See application file for complete search history.

(56) References Cited

U.S. PATENT DOCUMENTS 8,904,760 B2    12/2014 Mital
9,616,385 B1 *    4/2017 Huang ............... B01D 53/9477
(Continued)

FOREIGN PATENT DOCUMENTS

| FR | 2971007 | 8/2012 |
| KR | 20130056401 | 5/2013 |
| WO | 2014016616 | 1/2014 |

OTHER PUBLICATIONS

John Deere, "Technology to Reduce Emissions in Large Engines," brochure (first known to us Mar. 1, 2012) 2 pages.

*Primary Examiner* — Timothy C Vanoy
(74) *Attorney, Agent, or Firm* — Michael Best & Friedrich LLP

(57) ABSTRACT

An exhaust gas treatment system for an internal combustion engine includes an exhaust gas pathway configured to receive exhaust gas from the internal combustion engine, a first ammonia injector configured to inject ammonia into the exhaust gas pathway at a first rate, and a first treatment element positioned downstream of the first ammonia injector. A second ammonia injector is positioned downstream of the first treatment element. The second ammonia injector is configured to inject ammonia into the exhaust gas pathway at a second rate. A controller is configured to estimate an amount of particulate present in the exhaust gas and adjust at least one of the first rate or the second rate based on the estimate.

20 Claims, 6 Drawing Sheets

(51) Int. Cl.
  *F01N 3/20* (2006.01)
  *F01N 13/00* (2010.01)
  *B01J 23/40* (2006.01)
  *B01J 35/04* (2006.01)
  *F01N 11/00* (2006.01)

(52) U.S. Cl.
  CPC .......... *B01D 53/9495* (2013.01); *B01J 23/40* (2013.01); *B01J 35/04* (2013.01); *F01N 11/002* (2013.01); *F01N 11/007* (2013.01); *F01N 13/0093* (2014.06); *B01D 2255/102* (2013.01); *B01D 2255/2063* (2013.01); *B01D 2255/2065* (2013.01); *B01D 2255/2092* (2013.01); *B01D 2255/20707* (2013.01); *B01D 2255/20715* (2013.01); *B01D 2255/20723* (2013.01); *B01D 2255/50* (2013.01); *B01D 2255/70* (2013.01); *B01D 2255/904* (2013.01); *B01D 2255/915* (2013.01); *F01N 2550/05* (2013.01); *F01N 2560/021* (2013.01); *F01N 2560/026* (2013.01); *F01N 2560/05* (2013.01); *F01N 2560/06* (2013.01); *F01N 2560/07* (2013.01); *F01N 2560/08* (2013.01); *F01N 2610/02* (2013.01); *F01N 2610/146* (2013.01)

(56) References Cited

U.S. PATENT DOCUMENTS

| | | |
|---|---|---|
| 2005/0069476 A1 | 3/2005 | Blakeman et al. |
| 2009/0035194 A1 | 2/2009 | Robel et al. |
| 2009/0035195 A1* | 2/2009 | Robel .................... F01N 3/0231 422/177 |
| 2010/0064662 A1 | 3/2010 | Hinz et al. |
| 2010/0180579 A1 | 7/2010 | Huang et al. |
| 2011/0162347 A1 | 7/2011 | Katare et al. |
| 2013/0305695 A1 | 11/2013 | Henry et al. |
| 2015/0337702 A1 | 11/2015 | Ettireddy et al. |

* cited by examiner

SYSTEM AND METHOD FOR REGULATING EXHAUST EMISSIONS

CROSS-REFERENCE TO RELATED APPLICATIONS

This application is a continuation of co-pending U.S. patent application Ser. No. 14/870,039, filed on Sep. 30, 2015, the entire content of which is incorporated herein by reference.

BACKGROUND

The present disclosure relates to exhaust systems and more particularly to diesel exhaust treatment systems.

SUMMARY

Diesel emissions include two primary components that are subject to emissions regulations: particulate matter and nitrogen oxides ($NO_x$). A variety of exhaust treatment devices have been developed to reduce these emission components. For example, a diesel particulate filter (DPF) can be used to trap diesel particulate matter and oxidize soot, and a selective catalytic reduction (SCR) element can be used to convert the $NO_x$ present in exhaust gas into other compounds, such as nitrogen and carbon dioxide. Typically, diesel exhaust fluid (DEF) is injected upstream of the SCR element to provide ammonia, which acts as a reducing agent and reacts with the $NO_x$ in the presence of the SCR catalyst.

A selective catalytic reduction on filter (SCR+F) element combines SCR and DPF functionality such that $NO_x$ reduction and particulate matter filtration and oxidation can occur in a single element. This can provide a variety of advantages, including reduced size and cost. Soot oxidation, however, typically requires the presence of nitrogen dioxide ($NO_2$). Therefore, a tradeoff exists between $NO_x$ reduction and soot oxidation when an SCR+F element is used.

In one embodiment, an exhaust gas treatment system for an internal combustion engine includes an exhaust gas pathway configured to receive exhaust gas from the internal combustion engine, a first ammonia injector configured to inject ammonia into the exhaust gas pathway at a first rate, and a first treatment element positioned downstream of the first ammonia injector. A second ammonia injector is positioned downstream of the first treatment element. The second ammonia injector is configured to inject ammonia into the exhaust gas pathway at a second rate. A controller is configured to estimate an amount of particulate present in the exhaust gas and adjust at least one of the first rate or the second rate based on the estimate.

In another embodiment, a method of treating exhaust gas from an internal combustion engine as the exhaust gas passes through an exhaust gas pathway includes injecting ammonia, at a first rate, into the exhaust gas pathway at a first location. The method also includes treating the exhaust gas with a first treatment element positioned downstream of the first location, estimating an amount of particulate present in the exhaust gas, and adjusting the first rate based on the estimated amount of particulate.

In another embodiment, a method of treating exhaust gas from an internal combustion engine as the exhaust gas passes through an exhaust gas pathway includes injecting ammonia, at a first rate, into the exhaust gas pathway at a first location. The method also includes converting nitrogen oxides ($NO_x$) from the exhaust gas in a first treatment element positioned downstream of the first location, injecting ammonia, at a second rate greater than the first rate, into the exhaust gas pathway at a second location downstream of the first treatment element, and converting $NO_x$ from the exhaust gas in a second treatment element positioned downstream of the second location.

Other features and aspects of the disclosure will become apparent by consideration of the following detailed description and accompanying drawings.

Before any embodiments are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
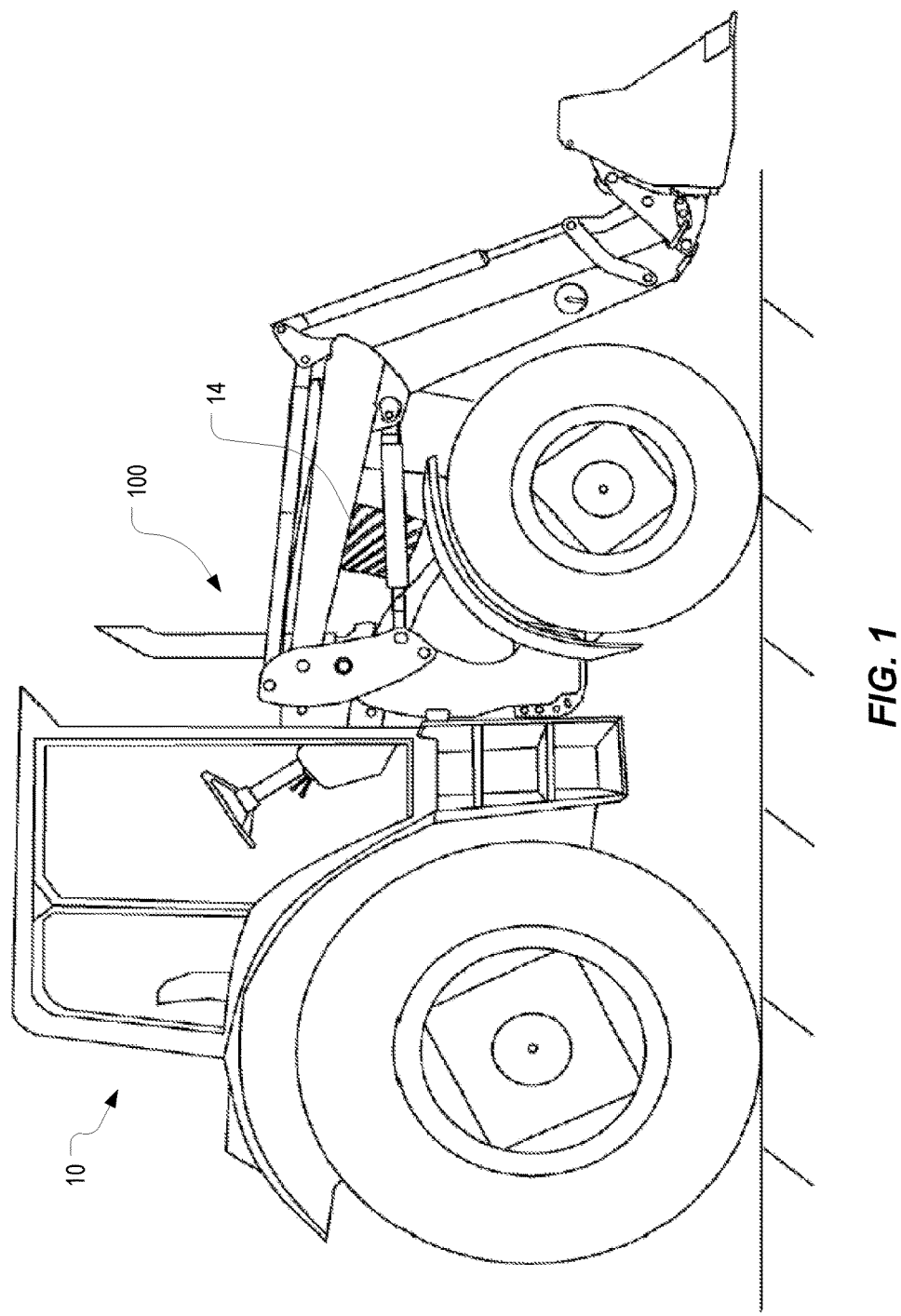
FIG. 1 is a side view of a vehicle in which the disclosed system and method for regulating exhaust emissions may be implemented.

FIG. 1 illustrates an exemplary vehicle 10 including a diesel-powered internal combustion engine 14 and an exhaust gas treatment system 100 according to one embodiment. The illustrated vehicle 10 is a utility tractor, but the exhaust gas treatment system 100 is not so limited in application and can be used in conjunction with any diesel-powered internal combustion engine. For example, the exhaust gas treatment system 100 can be used in other work vehicles, passenger vehicles, or other equipment powered by a diesel engine (e.g., generators, compressors, pumps, and the like).

Figure 2:
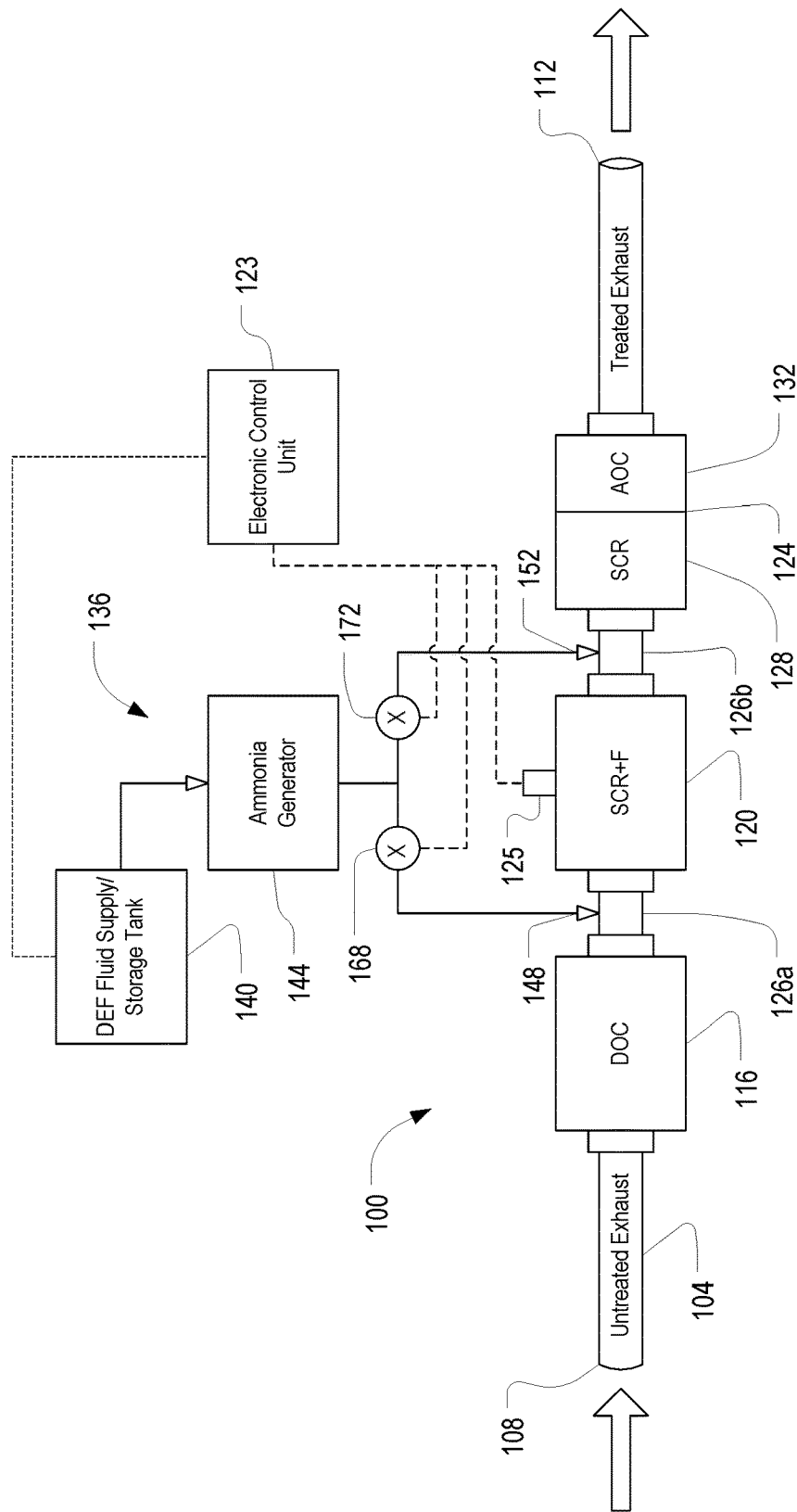
FIG. 2 is a schematic diagram of an exhaust gas treatment system according to one embodiment.

With reference to FIG. 2, the exhaust gas treatment system 100 includes an exhaust pathway 104 (e.g., an exhaust pipe) having an inlet or upstream side 108 and an outlet or downstream side 112. A preliminary treatment element 116, a first treatment element 120, and a second treatment element 124 are located in series along the exhaust pathway 104, between the inlet 108 and the outlet 112. The numeric designations "first," "second," etc. are used herein for convenience and should not be regarded as defining order, quantity, or relative position.

In the illustrated embodiment, an electronic control unit (ECU 123) is provided to actively control various aspects of the operation of the exhaust gas treatment system 100. A sensor 125, which is a pressure drop (ΔP) sensor in the illustrated embodiment, is disposed proximate the first treatment element 120. The sensor 125 is communicatively coupled to the ECU 123 to provide feedback to the ECU 123 indicative of the performance of the exhaust gas treatment system 100. In some embodiments, one or more additional sensors may be provided to monitor various other parameters of the exhaust gas treatment system 100. These sensors may monitor, for example, $NO_x$ concentrations, ammonia concentrations, temperature, exhaust flow rate, and/or ash loading at one or more points along the exhaust pathway 104 and provide feedback to the ECU 123 indicative of the performance of the exhaust gas treatment system 100. In other embodiments, the exhaust gas treatment system 100 may not be actively controlled, and the sensor 125 and/or the ECU 123 may be omitted.

Figure 3:
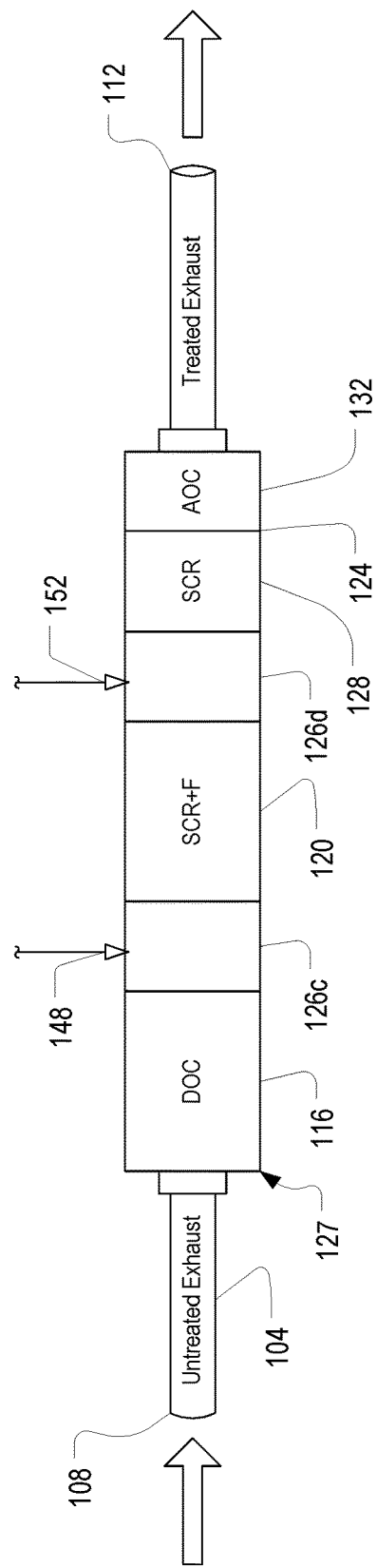
FIG. 3 is a schematic diagram of a portion of an exhaust gas treatment system according to another embodiment.

A first transition pipe 126a interconnects the preliminary and first treatment elements 116, 120, and a second transition pipe 126b interconnects the first and second treatment elements 120, 124. In the illustrated embodiment, the transition pipes 126a, 126b define an outer diameter that is smaller than an outer diameter of the treatment elements 116, 120, 124. In an alternate embodiment illustrated in FIG. 3, the treatment elements 116, 120, 124 are interconnected by transition pipes 126c, 126d. The transition pipes 126c, 126d define an outer diameter that is substantially the same as the outer diameter of the treatment elements 116, 120, 124. As such, the treatment elements 116, 120, 124 and the transition pipes 126c, 126d may collectively define a cylindrical exhaust gas treatment unit 127. In the illustrated embodiment, the transition pipes 126c, 126d each define an overall length that is less than their respective outer diameters. In some embodiments, the transition pipes 126c, 126d each define an overall length between about 30% and about 70% of their respective outer diameters.

The illustrated preliminary treatment element 116 is a diesel oxidation catalyst (DOC) element and includes, for example, a honeycomb support coated with a catalytic material, such as a platinum group metal. The preliminary treatment element 116 may be used to reduce some particulate matter, carbon monoxide, and hydrocarbons from exhaust passing through the DOC element. Alternatively, the preliminary treatment element 116 may include a different exhaust treatment configuration. In some embodiments of the exhaust treatment system 100, the preliminary treatment element 116 may be omitted. In other embodiments, the preliminary treatment element 116 may be included as a portion of a different treatment element (e.g., the first treatment element 120).

The first treatment element 120 in the illustrated embodiment is a combined selective catalytic reduction and diesel particulate filter (SCR+F) element and includes a catalytic washcoat on a porous filter substrate. The washcoat may include one or more base metal oxides, for example, such as $Al_2O_3$, $SiO_2$, $TiO_2$, $CeO_2$, $ZrO_2$, $V_2O_5$, $La_2O_3$. Alternatively or additionally, the washcoat may include one or more zeolites. The first treatment element 120 may be used to capture particulate matter, oxidize soot, and reduce $NO_x$ from exhaust gas passing through the first treatment element 120.

The second treatment element 124 in the illustrated embodiment includes a selective catalytic reduction (SCR) portion 128 and an ammonia oxidation catalyst (AOC) portion 132. The SCR portion 128 may include, for example, a catalytic washcoat on a monolithic support material, such as ceramic. The SCR portion 128 and the AOC portion 132 are positioned in series, with the AOC portion 132 located downstream of the SCR portion 128. The SCR portion 128 may be used to reduce $NO_x$ from exhaust gas passing through the SCR portion 128. The AOC portion 132 may be used to convert excess ammonia leaving the SCR portion 128 to nitrogen and water. In some embodiments, the AOC portion 132 may be omitted. Alternatively, the AOC portion 132 may be provided as a separate treatment element positioned downstream of the second treatment element 124.

With reference to FIG. 2, the exhaust gas treatment system 100 also includes an ammonia source 136, which includes a diesel exhaust fluid (DEF) supply 140 and an ammonia producing unit 144 in the illustrated embodiment. The DEF supply 140 is in fluid communication with the ammonia producing unit 144 to supply DEF (e.g., a urea solution) to the ammonia producing unit 144, which converts the DEF to ammonia gas (e.g., via thermolysis and hydrolysis). In some embodiments, a pump (not shown) is provided to move DEF from the DEF supply 140 to the ammonia producing unit 144. The pump may be variably controlled to vary the amount of DEF supplied to the ammonia producing unit 144, and thus vary the amount of ammonia output by the ammonia producing unit 144. In other embodiments, the DEF may move from the DEF supply 140 to the ammonia producing unit 144 under the influence of gravity. In such embodiments, one or more valves (not shown) may be provided between the DEF supply 140 and the ammonia producing unit 144 to vary the flow of DEF to the ammonia producing unit 144. In some embodiments, the DEF supply 140 may be omitted, and the ammonia producing unit 144 may include an ammonia supply, such as a pressurized ammonia storage tank.

The exhaust gas treatment system 100 further includes a first injector 148 and a second injector 152 in fluid communication with the ammonia producing unit 144. The first injector 148 and the second injector 152 can be directly fluidly coupled to the ammonia producing unit 144 (e.g., by independent conduits), or the first injector 148 and the second injector 152 can be fluidly coupled to a branch line, manifold, or other structure that receives ammonia from the ammonia producing unit 144. The first injector 148 is positioned to introduce ammonia into the first transition pipe 126a, downstream of the preliminary treatment element 116 and upstream of the first treatment element 120 (i.e. between the preliminary and first treatment elements 116, 120). The second injector 152 is positioned to introduce ammonia into the second transition pipe 126b, downstream of the first treatment element 120 and upstream of the second treatment element 124 (i.e. between the first and second treatment elements 120, 124).

Figure 4:
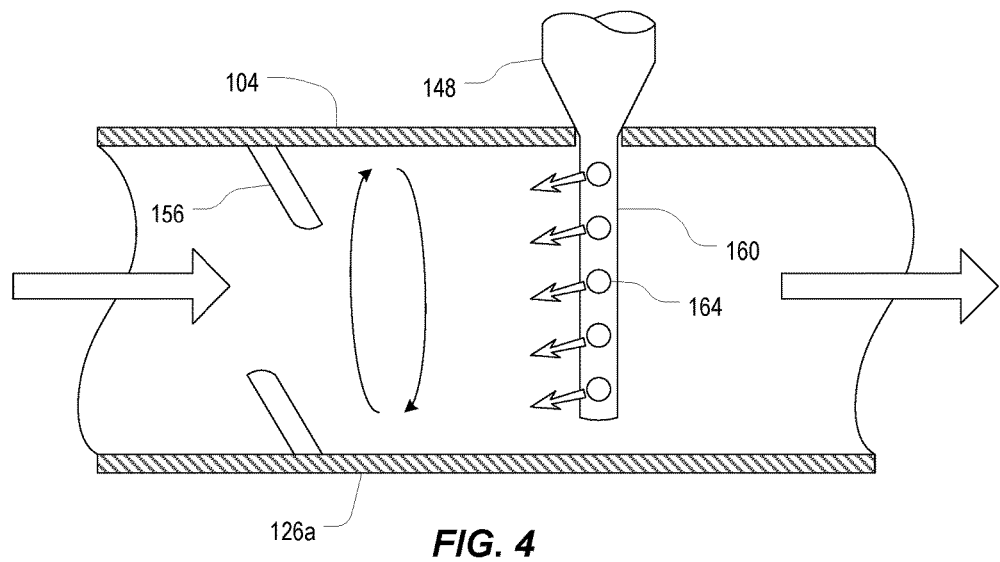
FIG. 4 is a cross-sectional view of a portion of the exhaust gas treatment system of FIG. 2, illustrating a flow-affecting feature according to one embodiment.
Figure 5:
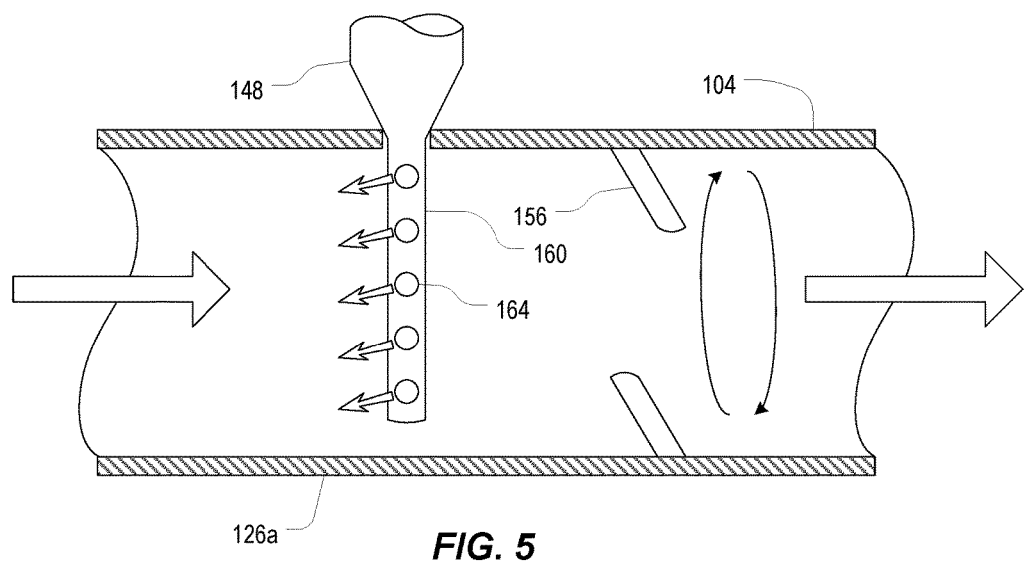
FIG. 5 is a cross-sectional view of a portion of the exhaust gas treatment system of FIG. 2, illustrating a flow-affecting feature according to another embodiment.

Referring to FIG. 4, the exhaust gas treatment system 100 may further include a flow affecting feature 156 in the exhaust pathway 104, positioned upstream of the first injector 148. In the illustrated embodiment, the flow affecting feature 156 is positioned within the first transition pipe 126a. The flow affecting feature 156 can be, for example, one or more fins, vanes, projections, or other suitable means to impart turbulence or swirling into the exhaust flow proximate the first injector 148. With reference to FIG. 5, in another embodiment, the flow affecting feature 156 may be positioned downstream of the first injector 148. Although not illustrated in FIG. 4 or FIG. 5, another flow affecting feature may be positioned in the second transition pipe 126b upstream or downstream of the second injector 152.

With continued reference to FIGS. 4 and 5, the first injector 148 may include an elongated portion 160 that extends into the exhaust pathway 104. A plurality of openings 164 in the elongated portion 160 allows ammonia to be expelled from the injector 148 at multiple locations in the exhaust pathway 104. Although not illustrated in FIG. 3, the second injector 152 may have a similar configuration.

With reference to FIG. 2, a first valve 168 is disposed between the ammonia producing unit 144 and the first injector 148, and a second valve 172 is disposed between the ammonia producing unit 144 and the second injector 152. In some embodiments, the first and second valves 168, 172 can be incorporated into the respective injectors 148, 152 or into the ammonia producing unit 144. In other embodiments, the exhaust treatment system 100 may include only one valve (i.e., the first valve 168 or the second valve 172). Alternatively, in some embodiments, the valves 168, 172 may be omitted.

Each of the illustrated valves 168, 172 is movable between a closed position in which the flow of ammonia through the valve 168, 172 is substantially inhibited, and an open position in which the flow of ammonia through the valve 168, 172 is substantially uninhibited. In some embodiments, one or both of the valves 168, 172 can also be actuated to at least one intermediate position, between the closed and open positions, in which the flow of ammonia through the valve 168, 172 is partially restricted. In some embodiments, one or both of the valves 168, 172 can be modulated to vary the flow rate of ammonia. In the illustrated embodiment, the valves 168, 172 are controlled by the ECU 123.

Figure 6:
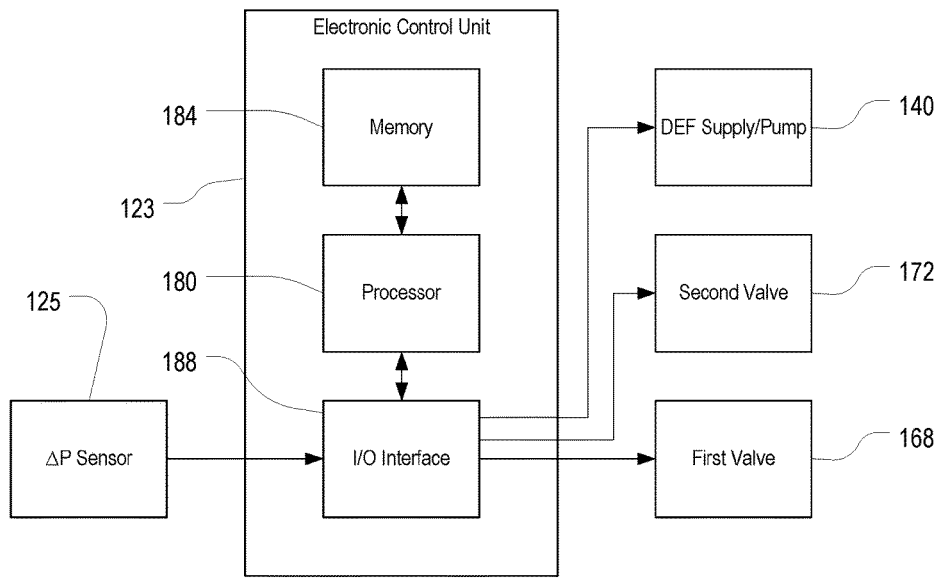
FIG. 6 is a block diagram of an electronic control unit of the exhaust gas treatment system of FIG. 2.

FIG. 6 illustrates an example of the ECU 123 for control of the exhaust gas treatment system 100. The ECU 123 includes a plurality of electrical and electronic components that provide power, operational control, and protection to the components and modules within the ECU 123. In particular, the ECU 123 includes, among other things, an electronic processor 180 (e.g., a programmable microprocessor, microcontroller, or similar device), non-transitory, machine-readable memory 184, and an input/output interface 188. The electronic processor 180 is communicatively coupled to the memory 184 and configured to retrieve from memory 184 and execute, among other things, instructions related to the control processes and methods described herein. In other embodiments, the ECU 123 includes additional, fewer, or different components. In the illustrated embodiment, the ECU 123 is communicatively coupled to the sensor 125, the DEF supply 140, the first valve 168, and the second valve 172. The ECU 123 may also be configured to communicate with external systems including, for example, engine controls and/or operator controls.

In operation, untreated exhaust from the internal combustion engine 14 (FIG. 1) is directed into the exhaust pathway 100 at the inlet 104 (FIG. 2). The exhaust then flows through the preliminary treatment (DOC) element 116, which reduces some particulate matter, carbon monoxide, and hydrocarbons from the exhaust. Ammonia is introduced into the partially-treated exhaust downstream of the preliminary treatment element 116 via the first injector 148. Because the first injector 148 includes multiple holes 164, the ammonia is more uniformly dispersed into the exhaust stream (FIG. 4). In addition, turbulence or swirling movement imparted by the flow affecting feature 156 enhances mixing to create a relatively homogeneous mixture of exhaust and ammonia within a relatively short distance from the injector 148. Thus, the distance between the preliminary and first elements 116, 120 can be minimized.

The ammonia and exhaust mixture then enters the first treatment (SCR+F) element 120 (FIG. 2). The ammonia reacts with $NO_x$ in the presence of the catalyst to form nitrogen and water, while soot is captured and oxidized on the porous filter substrate. When the exhaust exits the first treatment element 120, additional ammonia is introduced via the second injector 152. Like the first injector 148, the second injector 152 preferably includes a plurality of holes (not shown), to more uniformly disperse the ammonia into the exhaust stream, and an additional flow affecting feature (not shown) is preferably provided proximate the second injector 152 to further enhance mixing. Thus, the distance between the first and second treatment elements 120, 124 can be minimized.

The ammonia and exhaust mixture then enters the second treatment element 124, where the ammonia reacts with any remaining $NO_x$ in the SCR portion 128, and any unreacted ammonia is subsequently oxidized in the AOC portion 132. The treated exhaust then exits the exhaust gas treatment system 100 through the outlet 108.

The amount of $NO_x$ converted in the first and second treatment elements 120, 124 is dependent upon the amount of ammonia injected. In the illustrated embodiment, the total amount of ammonia injected is controlled by the rate at which DEF is supplied to the ammonia producing unit 144. DEF flows from the DEF supply 140 to the ammonia producing unit 144 at a rate that may be controlled by the ECU 123, and the ammonia producing unit 144 produces ammonia gas from the DEF. The ammonia gas flows from the ammonia producing unit 144, through the valves 168, 172, and to the injectors 148, 152, which inject the ammonia into the exhaust pathway 104.

Because proper soot oxidation in the first treatment element 120 requires the presence of $NO_x$ (specifically, $NO_2$), the amount of ammonia flowing through the first injector 148 is limited so that some of the $NO_x$ remains unreacted through the first treatment element 120. In the illustrated embodiment, ammonia flows through the first injector 148 at a first rate, and ammonia flows through the second injector 152 at a second rate that is greater than the first rate. The ECU 123 may adjust the flow of ammonia into the exhaust pathway 104 by modulating the first valve 168, the second valve 172, and/or the rate at which DEF flows to the ammonia producing unit 144.

Figure 7:
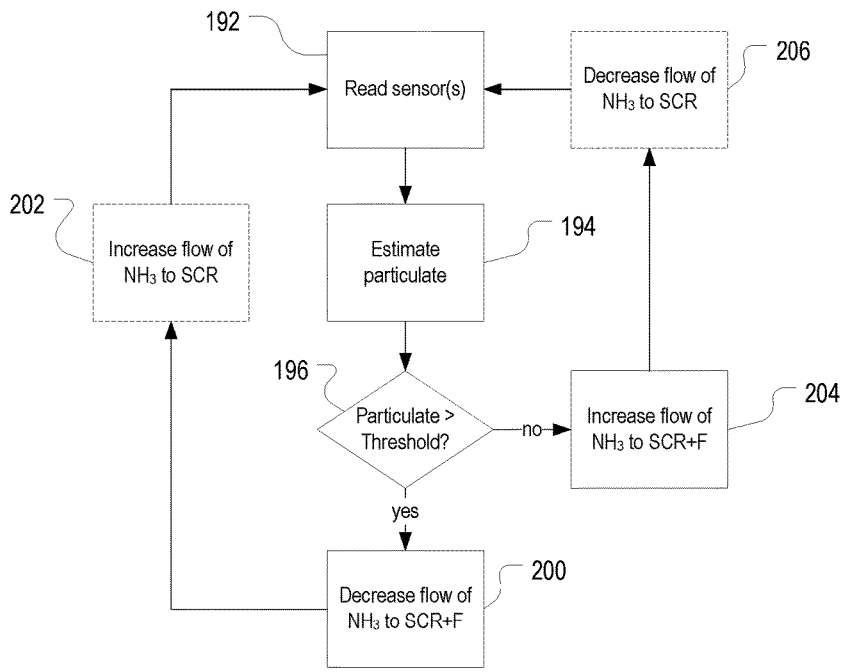
FIG. 7 is a flow diagram of operation of the exhaust gas treatment system of FIG. 2.

With reference to FIG. 7, the ECU 123 may periodically or continuously read a value or signal from the sensor 125 at block 192 (via the input/output interface 188), which is indicative of the pressure drop across the first treatment element 120. The ECU 123 uses the sensed value to determine whether the first treatment element 120 is properly oxidizing soot. The pressure drop may be correlated with the amount of soot or particulate present in the first treatment element 120. For example, as the amount of particulate in the first treatment element 120 increases, the pressure drop increases, and as the amount of particulate in the first treatment element 120 decreases, the pressure drop decreases. From this correlation, the ECU 123 can determine an estimated particulate parameter at block 194, which may correspond with an estimated amount of particulate in the first treatment element 120. In some embodiments, the ECU 123 may periodically or continuously read a value or signal from one or more additional or alternative sensors (e.g., $NO_x$ sensors, ammonia sensors, temperature sensors, ash loading sensors, exhaust flow rate sensors, etc.). The values or signals from these sensors may be factored into the ECU's determination of the estimated particulate parameter.

At block 196, the ECU 123 may then periodically or continuously compare the estimated particulate parameter with a threshold value or value range, stored in memory 184, which is representative of a target soot oxidation performance level. If the estimated particulate parameter is greater than the threshold value (i.e., if the level of particulate in the first treatment element 120 is high), the ECU 123 decreases the flow of ammonia through the first injector 148 at block 200 by restricting flow through the first valve 168. Accordingly, the amount of $NO_x$ available for soot oxidation will increase. Optionally, the ECU 123 may then increase the flow of ammonia through the second injector 152 at block 202 by opening the second valve 172. If the estimated particulate parameter is less than the threshold value (i.e., if the level of particulate in the first treatment element 120 is low), the ECU 123 can increase the flow of ammonia through the first injector 148 at block 204 by opening the first valve 168. Accordingly, the amount of $NO_x$ will be reduced. Optionally, the ECU 123 may then decrease the flow of ammonia through the second injector 152 at block 206 by restricting flow through the second valve 172. In embodiments where either the first valve 168 or the second valve 172 is omitted, the first and second injectors 148, 152 are in fluid communication such that an increase in flow through the first injector 148 results in a proportional decrease in flow through the second injector 152, and vice versa.

Figure 8:
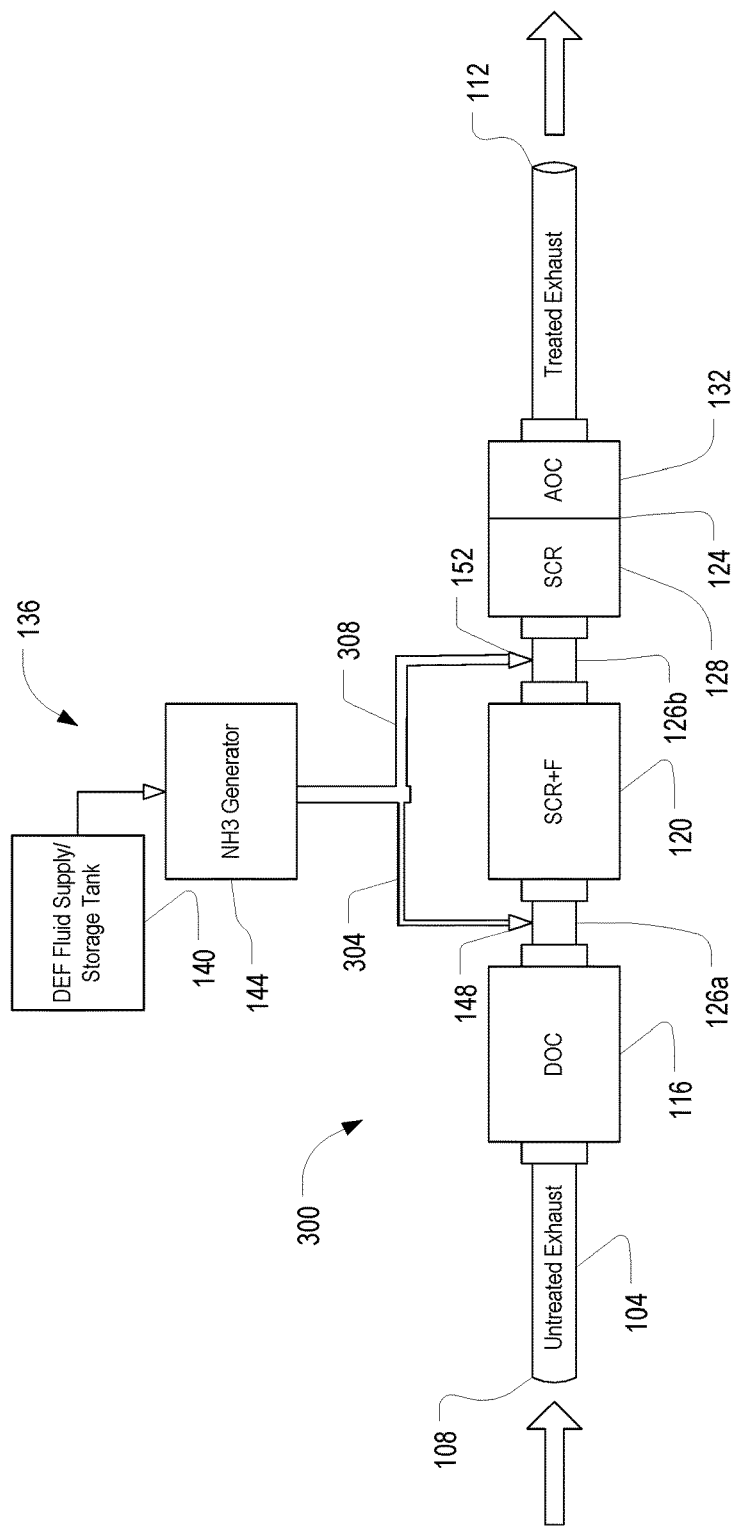
FIG. 8 is a schematic diagram of an exhaust gas treatment system according to another embodiment.

FIG. 8 illustrates an exhaust gas treatment system 300 according to another embodiment. The exhaust gas treatment system 300 is similar to the exhaust gas treatment system 100 described above with reference to FIGS. 1-7. Accordingly, like features are given identical reference numbers, and only differences between the exhaust gas treatment system 300 and the exhaust gas treatment system 100 are described in detail.

The exhaust gas treatment system 300 includes a first ammonia passageway 304 extending between the ammonia producing unit 144 and the first ammonia injector 148 and a second ammonia passageway 308 extending between the ammonia producing unit 144 and the second ammonia injector 152. The first ammonia passageway 304 defines a first diameter, and the second ammonia passageway 308 defines a second diameter that is greater than the first diameter. In some embodiments, the passageways 304, 308 may have the same outer diameter but different inner diameters. In other embodiments, the passageways 304, 308 may have the same outer and inner diameters, and the first passageway 304 may include a restriction that reduces the effective inner diameter of the first passageway 304.

In operation, ammonia flows from the ammonia producing unit 144 to the injectors 148, 152 via the respective passageways 304, 308. Because the first passageway 304 is relatively restricted compared to the second passageway 308, ammonia flows through the first injector 148 at a first rate and through the second injector 152 at a second rate greater than the first rate. The passageways 304, 308 are sized to provide some $NO_x$ reduction in the first treatment element 120 and a greater amount of $NO_x$ reduction in the SCR portion 128 of the second treatment element 124. This configuration may preserve enough $NO_x$ in the first treatment element 120 for effective soot oxidation.

Various features of the disclosure are set forth in the following claims.

What is claimed is:

1. An exhaust gas treatment system for an internal combustion engine, the system comprising:
   an exhaust gas pathway configured to receive exhaust gas from the internal combustion engine;
   a first ammonia injector configured to inject ammonia into the exhaust gas pathway at a first rate;
   a first treatment element positioned downstream of the first ammonia injector;
   a second ammonia injector positioned downstream of the first treatment element, the second ammonia injector configured to inject ammonia into the exhaust gas pathway at a second rate; and
   a controller configured to estimate an amount of particulate present in the exhaust gas and adjust at least one of the first rate or the second rate based on the estimate.

2. The exhaust gas treatment system of claim 1, further comprising a sensor configured to sense at least one parameter selected from a group consisting of temperature, pressure, flow rate, ash loading, $NO_x$ concentration, and ammonia concentration.

3. The exhaust gas treatment system of claim 2, wherein the controller is configured to estimate the amount of particulate present in the exhaust gas based on the sensed parameter.

4. The exhaust gas treatment system of claim 1, further comprising a second treatment element positioned downstream of the second ammonia injector.

5. The exhaust gas treatment system of claim 1, wherein the second rate is greater than the first rate.

6. The exhaust gas treatment system of claim 1, further comprising a first valve disposed upstream of the first ammonia injector, and a second valve disposed upstream of the second ammonia injector.

7. The exhaust gas treatment system of claim 6, wherein the controller is configured to modulate the first valve to adjust the first rate and to modulate the second valve to adjust the second rate.

8. The exhaust gas treatment system of claim 1, further comprising a flow affecting feature positioned in the exhaust gas pathway upstream of the first ammonia injector, the flow affecting feature configured to create turbulence within the exhaust gas pathway to facilitate mixing the exhaust gas with the ammonia from the first ammonia injector.

9. The exhaust gas treatment system of claim 1, wherein the first ammonia injector includes a plurality of openings, each of the openings configured to introduce the ammonia into the exhaust gas pathway at a different position.

10. A method of treating exhaust gas from an internal combustion engine as the exhaust gas passes through an exhaust gas pathway, the method comprising:
    injecting ammonia, at a first rate, into the exhaust gas pathway at a first location;
    treating the exhaust gas with a first treatment element positioned downstream of the first location;
    estimating an amount of particulate present in the exhaust gas; and
    adjusting the first rate based on the estimated amount of particulate.

11. The method of claim 10, wherein estimating includes monitoring a pressure drop across the first treatment element.

12. The method of claim 10, further comprising injecting ammonia, at a second rate different than the first rate, into the exhaust gas pathway at a second location downstream of the first treatment element.

13. The method of claim 10, further comprising treating the exhaust gas with a second treatment element positioned downstream of the first treatment element.

14. The method of claim 10, wherein treating the exhaust gas with the first treatment element includes converting nitrogen oxides ($NO_x$) from the exhaust gas.

15. A method of treating exhaust gas from an internal combustion engine as the exhaust gas passes through an exhaust gas pathway, the method comprising:

injecting ammonia, at a first rate, into the exhaust gas pathway at a first location;

converting nitrogen oxides ($NO_x$) from the exhaust gas in a first treatment element positioned downstream of the first location;

injecting ammonia, at a second rate greater than the first rate, into the exhaust gas pathway at a second location downstream of the first treatment element; and converting $NO_x$ from the exhaust gas in a second treatment element positioned downstream of the second location.

16. The method of claim 15, further comprising determining a particulate parameter indicative of an amount of particulate present in the exhaust gas; and adjusting at least one of the first rate or the second rate based on the particulate parameter.

17. The method of claim 16, wherein determining the particulate parameter includes correlating a sensed parameter with an amount of particulate present in the exhaust gas.

18. The method of claim 17, wherein the sensed parameter represents a pressure difference measured across the first treatment element.

19. The method of claim 15, wherein adjusting further includes modulating a first valve to adjust the first rate and modulating a second valve to adjust the second rate.

20. The method of claim 15, wherein injecting ammonia at the first location includes passing the ammonia through a first passageway defining a first diameter, and wherein injecting ammonia at the second location includes passing the ammonia through a second passageway defining a second diameter greater than the first diameter.

* * * * *